United States Patent [19]

Taylor et al.

[11] 4,374,601
[45] Feb. 22, 1983

[54] VEHICLE CARGO BOX COVER

[75] Inventors: Chester J. Taylor, Warren; Carl O. Hinkley, Detroit, both of Mich.

[73] Assignee: The United States of America as represented by the Secretary of the Army, Washington, D.C.

[21] Appl. No.: 161,548

[22] Filed: Jun. 20, 1980

[51] Int. Cl.³ .............................................. B60N 1/00
[52] U.S. Cl. ...................................... 296/63; 296/147
[58] Field of Search ................ 296/63, 147, 67, 216, 296/27, 191, 102, 36, 32, 10

[56] References Cited

U.S. PATENT DOCUMENTS

| | | | |
|---|---|---|---|
| 1,287,117 | 12/1918 | Shepherd | 296/102 |
| 2,324,508 | 7/1943 | Johnson | 296/36 |
| 2,690,351 | 9/1954 | Giles | 296/27 |
| 3,097,013 | 7/1963 | Mussler | 296/27 |
| 3,155,419 | 11/1964 | Garson et al. | 296/147 |
| 3,841,690 | 10/1974 | Piercy | 296/10 |
| 3,930,680 | 1/1976 | Littlefield | 296/10 |
| 3,955,845 | 5/1976 | Werner | 296/10 |

*Primary Examiner*—Joseph F. Peters, Jr.
*Assistant Examiner*—John A. Carroll
*Attorney, Agent, or Firm*—Peter A. Taucher; John E. McRae; Nathan Edelberg

[57] ABSTRACT

In a military vehicle having a cargo box containing two facing troop seat assemblies, the improvement comprising a rigid cargo box cover mountable on the box to shield the seated military personnel from the weather, said cover being formed of disconnectable panels for knockdown into a relatively flat storage package. The rigid cover is connected to the cargo box and also to the back structures of the troop seat assemblies so that the cover and seat assemblies act as mutual reinforcements for one another.

1 Claim, 11 Drawing Figures

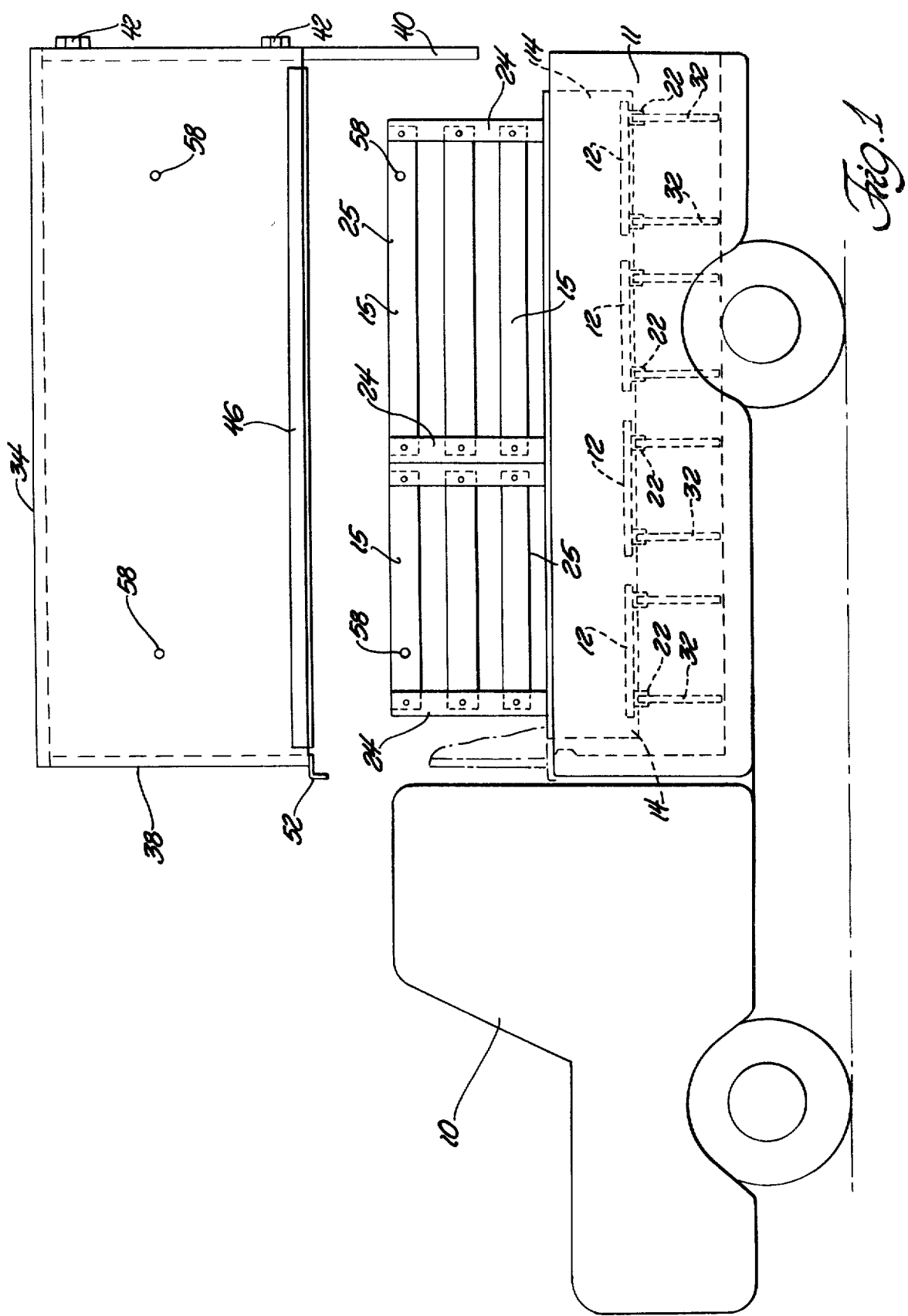

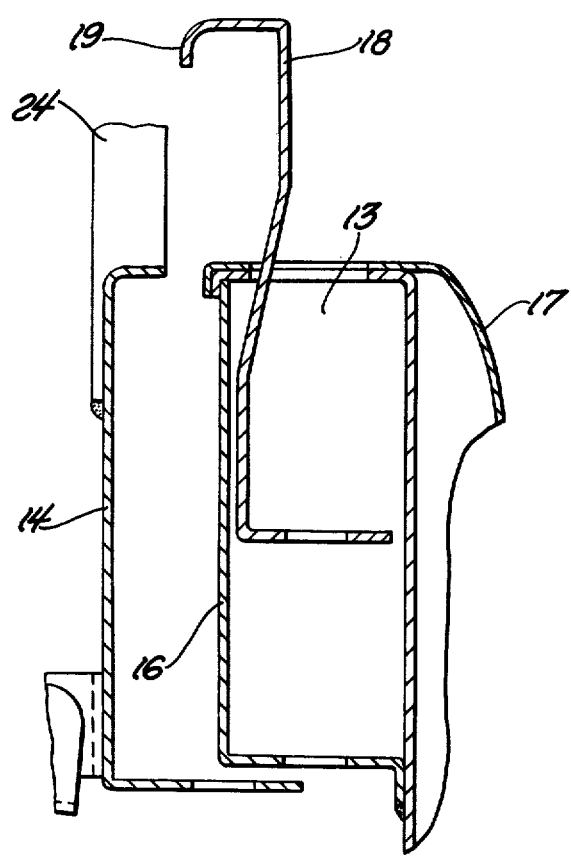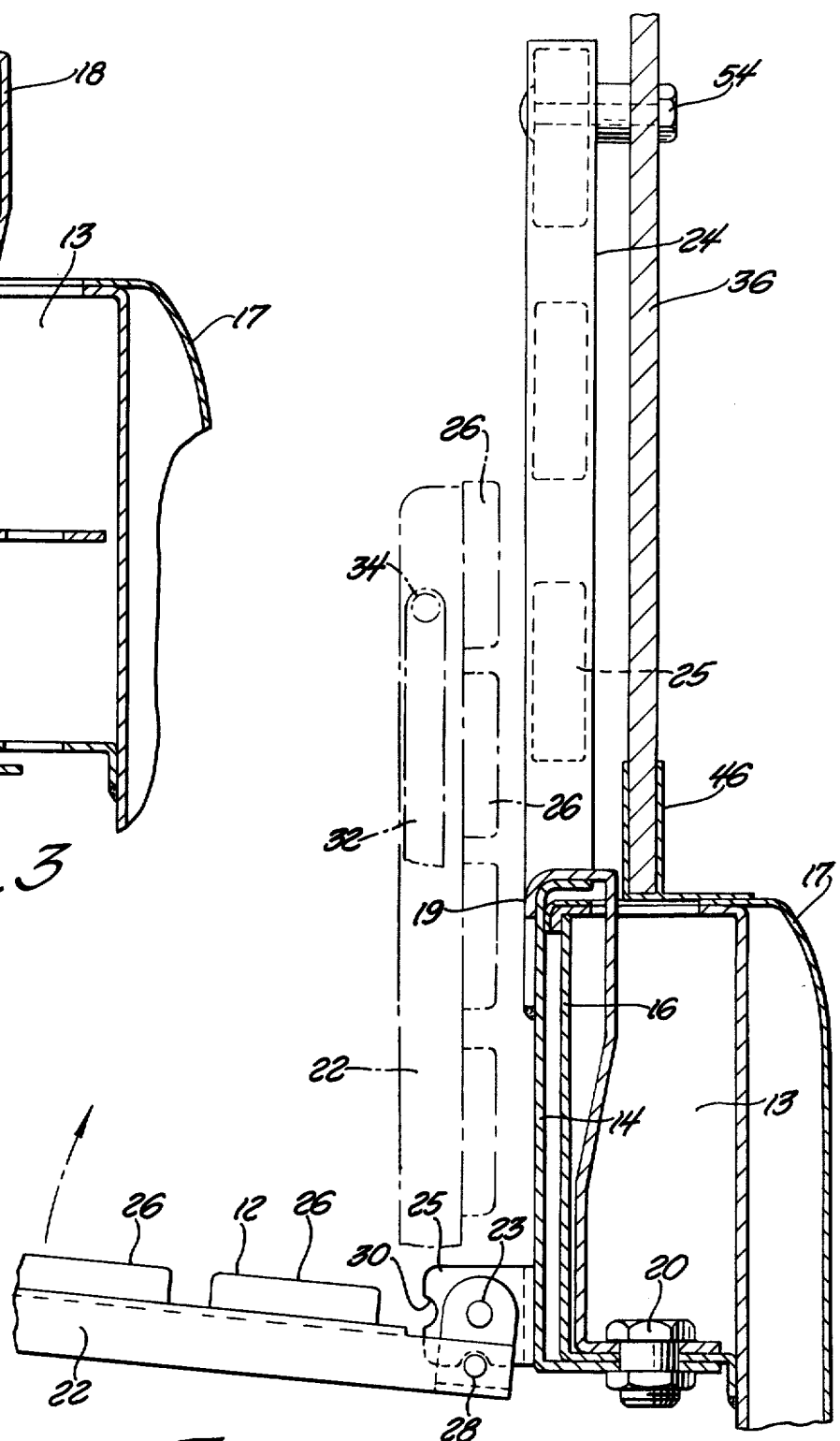

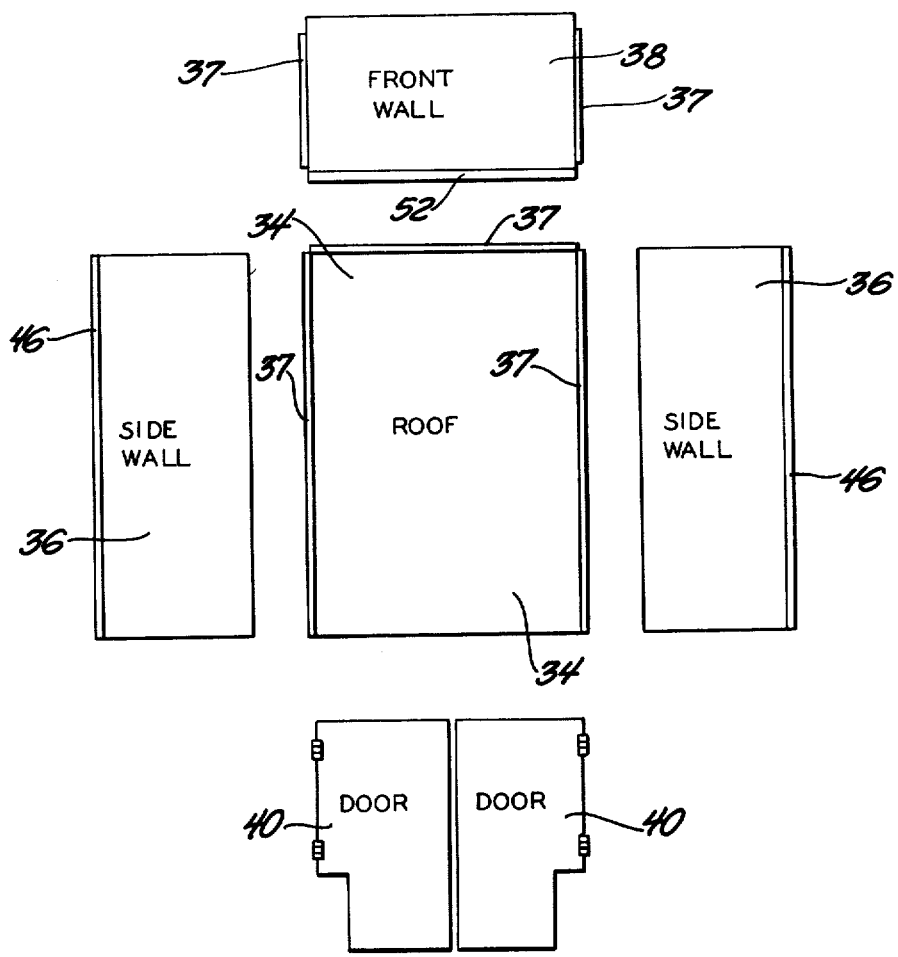
Fig. 4
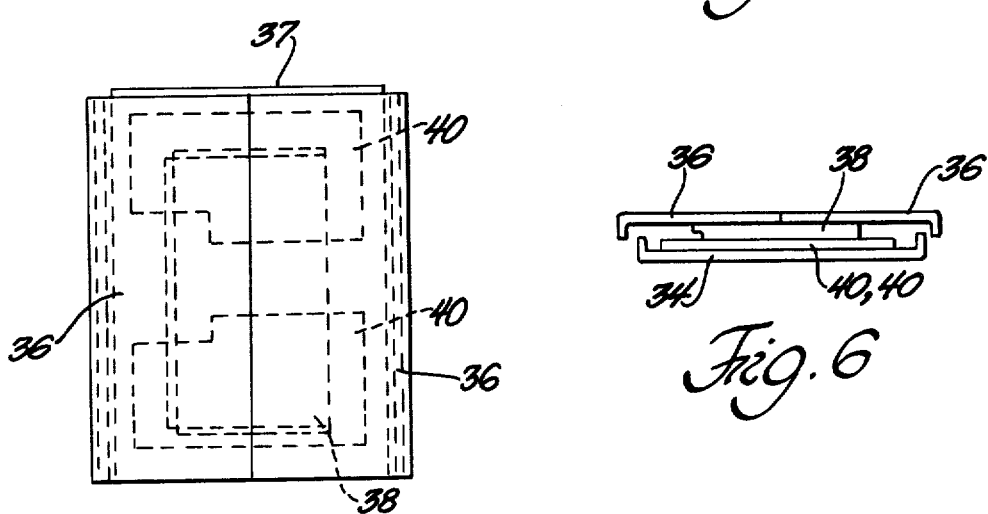
Fig. 5
Fig. 6

VEHICLE CARGO BOX COVER

BACKGROUND AND SUMMARY OF THE INVENTION

To improve the versatility of military trucks it is conventional practice to provide troop seat assemblies in the cargo boxes of such trucks. When the truck is being used to transport troops the seat assemblies are installed in the cargo box to seat the troops in facing relation on opposite sides of the longitudinal center line of the box. Commonly, there are eight seats, four on each side of the cargo box. When it is desired to transport cargo the seats are either folded or removed from the cargo box. In either case it is common practice to shield the troops or cargo from wind and weather by means of canvass covers stretched over metal bows or frames that are detachably mounted on the sidewalls of the cargo box. These fabric covers are not fully satisfactory in that they tend to flap or vibrate at relatively high vehicle speeds, thereby transmitting shock loads to grommet-turnbutton tie downs that are arranged between the fabric cover and the cargo box. The average service life of these fabric covers is less than desired.

A further disadvantage of the fabric cover is undesired noise due to the relatively fast flapping or vibration of the fabric while the vehicle is moving. The present invention is concerned with elimination of these deficiencies, namely the short service life and the high noise factor associated with fabric covers. We have attempted to overcome the deficiencies without appreciably increasing the cost of the cover or introducing other problems such as excessive weight or excessive storage space requirements. Our suggested cover design incorporates rigid panels that are relatively thin for keeping the total cover weight reasonably small, not more than about 180 pounds. We achieve a small storage space package by constructing the cover as a series of detachable panels capable of being knocked down into a relatively flat storage package. We reinforce the cover joints by means of relatively light metal panel attachment elements; also, we interconnect the cover and the aforementioned troop seat assemblies so that each tends to reinforce the other against displacement from the cargo box.

The invention described herein may be manufactured, used and licensed by or for the Government for governmental purposes without payment to either of us of any royalty thereon.

THE DRAWINGS

FIG. 1 is a side elevational view of a military vehicle intended to utilize our invention.

FIGS. 2 and 3 fragmentarily illustrate features of a troop seat. assembly mounted in FIG. 1 truck.

FIG. 4 illustrates an assembly of knockdown panels that we use to form our cargo box cover.

FIGS. 5 and 6 illustrate FIG. 4 panels stacked together to form a storage package.

Figure 7:
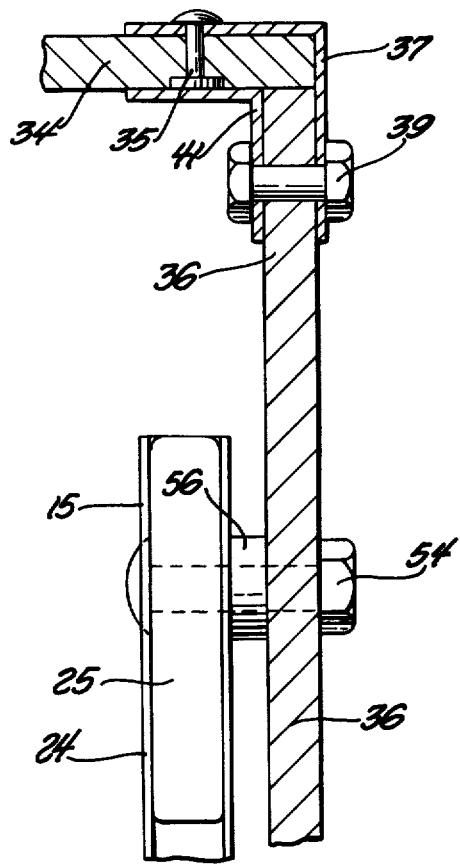
FIGS. 7 through 11 illustrate structural details for connecting the panels of our cover together and mounting same on the vehicle cargo box.

Referring in greater detail to FIG. 1, there is shown a conventional military vehicle comprising a cab 10 and cargo box 11; the tailgate is removed. Installed within the vehicle are two foldable troop seat assemblies, each including four seat elements 12 and back structures 15. Each seat assembly is carried on a longitudinal channel 14 extending substantially the entire length of cargo box 11. As shown in FIGS. 2 and 3 channel 14 is designed to partially encircle the box-forming wall 16 of cargo box sidewall 17. Channel 14 is retained on the box sidewall by means of two Z shaped brackets 18 extending within stake pockets 13 formed in the cargo box sidewall near the front and rear ends of the box. Each bracket 18 includes a flange 19 adapted to hook over channel 14; a nut-bolt assembly 20 extends through aligned holes for securing the bracket and channel 14 rigidly on the cargo box. As shown in exploded FIG. 3, channel 14 and brackets 18 can be disconnected to remove the seat assembly from the cargo box.

The individual seats 12 comprise two similar channels 22 having pivotal connections 23 with brackets 25 carried on channel 14. Four transverse wooden slats 26 are riveted or otherwise secured to channels 22 to form the occupant-engagement surface. The individual seats are retained in the use position by means of removable pins 28 extending through holes in channels 22 and semi-circular notches in the lower edges of brackets 25. After removal of each pin 28 the seat can be swung upwardly to the FIG. 2 dash line position, after which pins 28 can be reinserted into the bracket holes in channel 22 and semicircular notches 30 in brackets 25 to retain the seat in its folded position. Each seat includes two support legs 32 swingably connected at 34 to respective ones of channels 22.

As best shown in FIG. 1, each back structure 15 comprises four upright channels 24 welded to the aforementioned horizontal channel 14 for supporting a series of transverse horizontal wooden slats 25; rivets or bolts may be used as connector devices between channels 24 and the wooden slats. It will be understood that the vehicle is normally equipped with two of the described foldable troop seat assemblies arranged to support eight military personnel seated facing the longitudinal center line of the cargo box.

The structure thus far described is already known and used. Our invention relates to a rigid cargo box cover shown in FIG. 1 spaced above the cargo box 11. The cover is lowerable onto the cargo box to provide a shelter for the seated military personnel.

As shown in FIG. 4, the cargo box cover consists of six panels, namely roof panel 34, two side panels 36, front panel 38 and two door panels 40. FIGS. 5 and 6 illustrate the panels knocked down and nested together to form a relatively flat storage package having approximately the same plan dimension as roof panel 34. Assuming each panel has a thickness of ¼ inch, the total thickness of the panel package will only be in the neighborhood of one or two inches, sufficiently small to permit storage of a panel package in a relatively small space; preferably the panels are banded together with wraparound bands to attain the storage mode.

Figure 8:
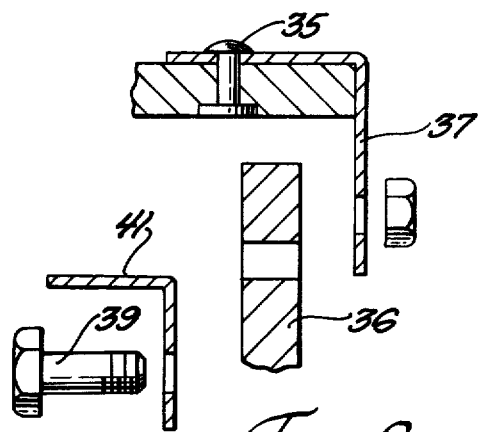

Each of the panels is formed of a relatively light weight material such as plywood or fiberglass having a thickness no greater than ¼ inch. The various panels are connected together by means of relatively light weight aluminum angle members extending along edge areas of the panels and provided with holes at selected points therealong to permit bolts to extend therethrough for rigid interconnection of the panels. As shown in FIG. 4, roof panel 34 is equipped with three angle members 37 at its front and side edges for attachment of the roof panel to the associated front panel 38 and side panels 36. Panel 38 is provided with similar angle members 37 for its attachment to side panels 36. FIGS. 7 and 8 illustrate the configuration of one of the angle members 37. As there shown, the angle member is permanently affixed to panel 34 by means of rivets 35. Nut-bolt assemblies 39 extend through preformed holes in panel 36 and internal angle member 41 to provide the desired connection between roof panel 34 and side panel 36; member 41 preferably extends approximately the full length of the connected panels. Connection mechanisms similar to those shown in FIG. 7 may be used to interconnect the various panels 34, 36 and 38 into a rigid cover structure. Preferably each angle member 37 or 41 is formed of light weight aluminum.

Figure 9:
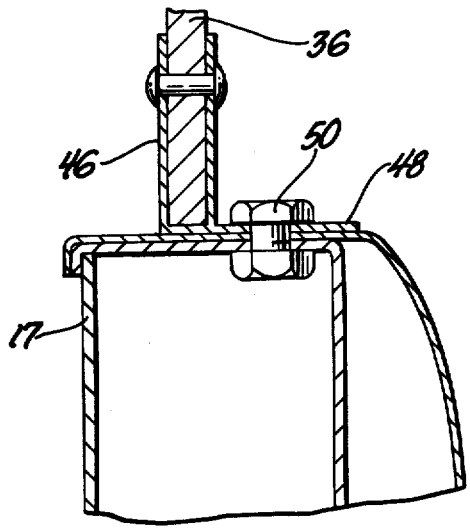
Figure 10:
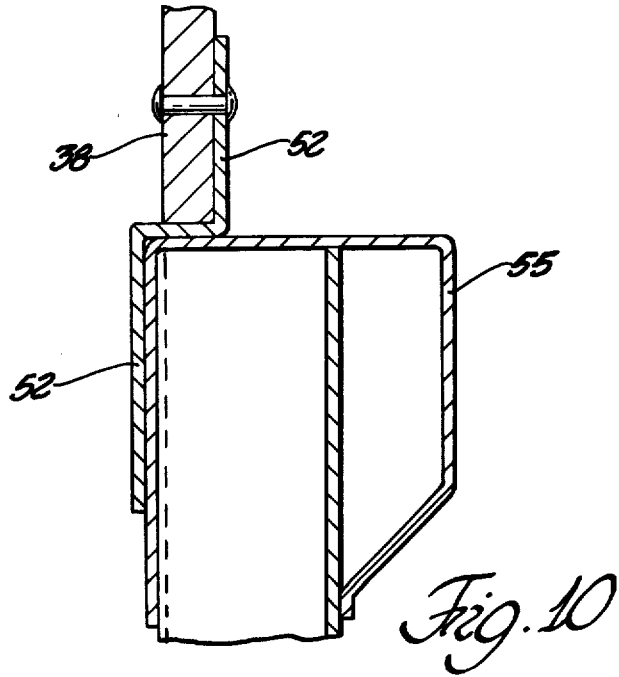
Figure 11:
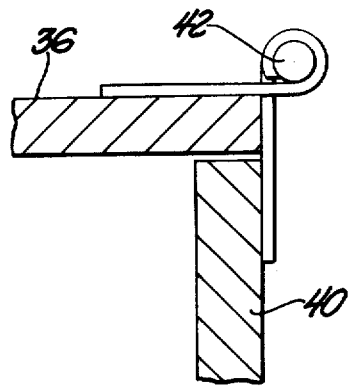

The doors 40 are connected to the rear edges of side panels 36 by means of hinges 42, said hinges having disconnectable pintles to permit knockdown of the panel assembly into the FIG. 5 storage package. When the cover is in its FIG. 1 operative condition it is lowered onto cargo box 11 so that its side panels 36 rest on the upper edges of the cargo box side walls 17. FIGS. 9 and 10 illustrate the orientation of cover side wall or panel 36 and front wall 38 relative to the vehicle cargo box. As shown in FIG. 9, each panel 36 has a metal attachment element 46 permanently affixed to its lower edge, as by rivets extending through flanges on the attachment element. Horizontal flange 48 of the attachment element extends normal to the plane of panel 36 for positionment on the upper edge of the cargo box side wall. Fasteners, such as screws or bolts 50 extend through flange 48 to anchor the cover on the cargo box; fastener elements 50 are oriented to resist upward pull-out of the cover from the cargo box. As shown in FIG. 10, the cover includes a metal strip 52 permanently affixed to front panel 38 to sit on the upper edge of cargo box front wall 55, thus preventing entrance of rain or wind into the occupant space.

We contemplate that the fastener system shown in FIG. 9 will by augmented by a second set of fastener elements trained between the cover side walls 36 and the seat back structures 15. As best shown in FIG. 7, the second set of fastener elements comprise nut-bolt assemblies 54 and spacers 56. The illustrated fastener assemblies are oriented to resist lateral displacement of the cover relative to each seat back structure 24. It is believed that the fastener system will act as a mutual rigidifying reinforcement for the cover and seat back structure. FIG. 1 shows hole locations 58 in the cover and seat back structure for accommodating the fastener elements 54. The holes would probably be drilled onsite after the cover is positioned on the cargo box.

By way of recapitulation, the invention is intended to provide a rigid cover that avoids some problems associated with conventional canvass covers used on military vehicles, especially short service life and wind noise associated with canvass covers. We have designed our rigid cover to be a knockdown structure, as shown in FIGS. 4 through 6, without being unduly heavy or fragile. Preferably, the individual panels are relatively thin, no more than ¼ inch, and relatively light, being formed of plywood or fiberglass. The panel connections are designed to include relatively light weight aluminum angle elements. Hopefully, the entire cover assembly will weigh no more than approximately 180 pounds. We intend to utilize standard non-special materials such as plywood, fiberglass and aluminum angles, configured to avoid requirement for expensive forming machinery such as molds, dies or assembling fixtures. If a more elaborate cover were desired, for such purposes as armor protection against enemy sniper firing or thermal insulation in artic environments, the desired capabilities could be achieved with add-on armor panels or insulated panels without a great deal of difficulty.

We wish it to be understood that we do not desire to be limited to the exact details of construction shown and described for obvious modifications will occur to a person skilled in the art.

We claim:

1. In a military truck having a cab cargo box, and two foldable troop seat assemblies detachably carried in the cargo box for supporting military personnel in seated positions facing the longitudinal centerline of the box, each troop seat assembly including a series of foldable seat elements (12) and a seat back structure (15) extending along and above one of the cargo box side walls: the improvement comprising a rigid cargo box cover mountable on the box to shield the seated military personnel from the weather; said cover comprising a roof panel, a front panel, two side panels, and a pair of doors individually swingably connectable to rear edges of the side panels for personnel access into or out of the cargo box; said panels being detachably connected together for disassembly into a relatively flat storage package having substantially the same plan dimension as the roof panel; the mounting mechanism for the cargo box cover comprising a first set of fastener bolts (50) trained between the cover side panels and the cargo box side walls, and a second set of fastener bolts (54) trained between the cover side panels and the seat back structures; the first fastener bolts (50) being vertically oriented to resist upward pull-out of the cover from the box; the second fastener bolts (54) being horizontally oriented to resist lateral displacement of the cover relative to the seat back structure; each panel being formed as a flat structure out of a material selected from plywood and fiberglass, the thickness of each panel being a maximum of one quarter inch; the roof panel having panel-attachment elements permanently affixed to three of its four edge areas, each panel-attachment element being an aluminum angle member (37) having one of its flanges adhered to a face area of the roof panel and its other flange extending normal to the roof panel plane; each side panel having a cargo box attachment element (46) permanently affixed to the panel lower edge, each cargo box attachment element being an aluminum angle member having an upstanding vertical flange adhered to a face area of the panel and another flange (48) extending horizontally normal to the plane of the side panel for placement on an upper edge of the cargo box side wall; said first fastener bolts (50) extending downwardly through said horizontal flange (48) into the cargo box side wall.

* * * * *